US012769114B2

(12) United States Patent
Jiang et al.

(10) Patent No.: US 12,769,114 B2
(45) Date of Patent: Oct. 20, 2026

(54) OPTICAL PHASED ARRAY DEVICE THAT CAN FLEXIBLY SET THE LIGHT SPLITTING WEIGHT AND HAS GOOD SCALABILITY

(71) Applicant: NANJING UNIVERSITY, Nanjing (CN)

(72) Inventors: Wei Jiang, Nanjing (CN); Guihan Wu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 209 days.

(21) Appl. No.: 18/501,734

(22) Filed: Nov. 3, 2023

(65) Prior Publication Data

US 2024/0151963 A1 May 9, 2024

(30) Foreign Application Priority Data

Nov. 3, 2022 (CN) ........................ 202211367593.6

(51) Int. Cl.
*G02B 27/00* (2006.01)
*G02B 6/28* (2006.01)

(52) U.S. Cl.
CPC ....... *G02B 27/0087* (2013.01); *G02B 6/2813* (2013.01)

(58) Field of Classification Search
CPC .......................... G02B 27/0087; G02B 6/2813
USPC .......................................................... 359/577
See application file for complete search history.

(56) References Cited

U.S. PATENT DOCUMENTS

2019/0004394 A1* 1/2019 Shin ...................... G02F 1/3137

* cited by examiner

*Primary Examiner* — Bumsuk Won
*Assistant Examiner* — Mitchell T Oestreich
(74) *Attorney, Agent, or Firm* — MUNCY, GEISSLER, OLDS & LOWE, P.C.

(57) ABSTRACT

An optical phased array device, which can flexibly set the light splitting weight and has good scalability, includes a light splitting network, phase shifters, and emission units. Among them, the light splitting network of the device can set the optical power weight of the array element freely and has good scalability. The light splitting network of optical phased array consists of a series of basic elements, each of which can realize uniform or non-uniform light splitting of N channels. The light splitting network adopts a tree topology. The tree network structure can be freely designed, and the components used by the network nodes can also be freely selected. By freely designing the structure of the light splitting network and the components used by each node, the optical output distribution of the network can be set, so that the far field distribution of the optical phased array can be optimized.

10 Claims, 3 Drawing Sheets

OPTICAL PHASED ARRAY DEVICE THAT CAN FLEXIBLY SET THE LIGHT SPLITTING WEIGHT AND HAS GOOD SCALABILITY

TECHNICAL FIELD

The invention relates to the application field of integrated photonics, in particular to an optical phased array device, which comprises a light splitting network, a phase shifter and an emission unit. Among them, the light splitting network of the device can flexibly set the light power weight of the array element and has good scalability.

BACKGROUND TECHNOLOGY

Optical phased array can be used for beam scanning and control in light detection and ranging (LiDAR), wireless optical communication, free space optical communication, scanning imaging, three-dimensional (3D) imaging and other systems.

The far-field characteristics of optical phased array are usually described by the far-field distribution pattern, which contains the main beam, sidelobes and grating lobes. The sidelobe suppression ratio (defined as the ratio of the main beam intensity to the sidelobe intensity) is related to the emitting light intensity distribution of each emission unit of the optical phased array. The far field sidelobe suppression ratio of optical phased array with uniform light intensity emission distribution is about 13 dB. However, in some applications, such sidelobe suppression ratio cannot meet the requirements. In order to obtain a higher sidelobe suppression ratio, it is necessary to adjust the emitting light intensity of each emission unit of the optical phased array.

The structure of the optical phased array consists of a light splitting network, phase shifters and emission units. FIG. 1 is a structural diagram of this type of device. Generally, the light splitting network includes one optical input port; The light output from each output port of light splitting network is coupled to a phase shifter, which can adjust the phase of the optical signal passing through it. The output optical signal of the phase shifter is coupled to the emission unit, which emits the optical signal to the free space or other media or devices. The emission unit can be a waveguide that emits light from its end face or a grating (including a waveguide containing a grating that emits light vertically from the chip surface). The light intensity output from each emission element is regulated mainly through the light splitting network. At present, in the optical phased array, the common control method is to use the directional coupler (DC) to build the light splitting network, and adjust the output light intensity of each port by assigning a specific coupling length to each port. However, DC structure is sensitive to process deviation, and its actual device performance usually differs from the design value. Therefore, the light splitting network constructed by DC structure is difficult to achieve the expected goal. In addition, star coupler can be used to build a light splitting network with Gaussian distributed output. However, such a network cannot flexibly set the output light intensity of each port. Besides, when the number of output ports required by the optical phased array increases, the star coupler network architecture still has the problem of poor scalability.

Moreover, multiple 1×2 multimode interferometers (MMIs) can also be cascaded to form light splitting network. A single MMI device can divide the input light into two equal parts and then output. After cascade, it can form a full binary tree light splitting network to evenly distribute light across all ports. Note that a binary tree means that in the tree, every node except the input/output nodes of the entire tree has one input and 1 or 2 outputs. A full binary tree means that in the tree, every node except the input/output nodes of the entire tree have 2 outputs. Light enters from one effective port and the final number of output ports can be 8, 16, 32, 64, etc., according to the number of cascaded layers. That is to say, there is an exponential relationship between the number of output ports and the number of cascaded layers. However, most devices with this design can only achieve uniform light splitting, so the sidelobe suppression ratio of the far field can only reach about 13 dB.

SUMMARY OF THE INVENTION

The purpose of the invention is to provide an optical phased array device, whose light splitting network can flexibly set weights and has good scalability. Besides, such light splitting network is not sensitive to processing process deviation, and has certain processing robustness.

In order to realize the purpose of the invention, the specific technical scheme adopted by the invention is as follows:

An optical phased array device, whose light splitting network can flexibly set weights and has good scalability. Such light splitting network is composed of a series of elements, and the network adopts a tree topology structure, which can freely adjust its structure and the elements used by each node;

The elements of each node of the light splitting network are light splitters with N output ports, and the light intensity between N ports can be evenly or unevenly distributed. Such a light splitter can be a multimode interferometer (MMI) or other structures, including but not limited to Y-branch, T-branch and other multi branch components or N-output channel couplers, etc. When MMI is used, the MMI for non-uniform light splitting can be realized after the symmetrical MMI for uniform light splitting is processed. The device symmetry of the processed MMI is destroyed, so the non-uniform light splitting can be realized. Processing methods include but are not limited to cutting a triangle or rectangular area at the corner of the device.

The light splitting network of the device is a tree topology structure. There is one effective input port on the first layer of the network. After this port is coupled with a light splitter with $N_2$ output ports, the second layer of the network is formed, and the number of output ports of the network is expanded to $N_2$. By analogy, assuming that the network currently has L layers and the number of ports in the $L_{th}$ layer is $N_L$, each port in this layer can be coupled with a light splitter with multi-port output (the light splitters coupled to each port can be different) to expand the number of network ports, and at the same time, the number of layers in the network can be increased by one. Finally, the network forms a tree topology. In the hierarchical tree structure, for the sake of unity, it can be considered that each node of each layer has placed a light splitter, and the number of output ports $N \geq 1$. The case where $N=1$ corresponds to the special case that the corresponding node of a layer has no second branch (this special case includes the case where the node of the layer does not split the light).

The topological structure of the light splitting network of the device can be designed freely, that is, the connections between ports at all levels of the network can be set freely, which can also be understood as: the position of nodes on each branch of the tree structure can be set freely, and the type of light splitter at each node can be set freely. In addition, when the network topology is certain, that is, the connection between ports at all levels of the network is certain, the splitting ratio of each light splitter can be designed (for example, through finite element simulation of micro/nano photonic devices) to change the light splitting result of the final network.

In order to improve the robustness for process deviation, the entire light splitting network of the optical phased array uses as few types of light splitters as possible (such as two types of light splitters, each of which is repeatedly used at the network node), and achieves flexible light splitting results by adjusting the network topology. Considering the process characteristics of the current silicon photonic chip foundry, that is, only a small number of verified infrastructure units can be provided. Therefore, fewer types of light splitters are convenient for factories to improve the processing accuracy of specific light splitting components, thereby further enhancing the overall network's robustness for processing deviation. In addition, the basic element of the light splitting network is MMI, which has a greater tolerance for process deviation (that is, it has better robustness processing for deviation).

In the applications of optical phased array, in order to improve the sidelobe suppression ratio in the far-field pattern, the overall splitting ratio of the network output basically follows the characteristic of "strong output from the middle port, weak output from both ports" (i.e. weakening from the middle to both sides), as shown in FIG. 3 (*b*) & (*c*); In some cases, exceptions may also occur in a few output ports (not following the above characteristics), such as the overall splitting ratio of the network output being increased in the strength of a few output ports at the ends of both sides (weakening from the middle to both sides and then increasing), as shown in FIG. 3 (*a*) & (*d*).

The beneficial effects of the present invention:

(1) For an optical phased array with this light splitting network, the output light intensity of each channel or element can be freely adjusted within a certain range;

(2) For an optical phased array with this light splitting network, its far-field pattern can achieve higher sidelobe suppression ratio;

(3) The area occupied by this light splitting network of the optical phased array increases slowly with the number of output channels, which helps to save area and has good scalability;

(4) The performance of this light splitting network is not sensitive to process deviations and has a certain degree of processing robustness;

(5) This type of light splitting network of optical phased array only uses a limited kind of light splitters, making it easier to iteratively optimize its processing technology, further improving the network's processing robustness.

(6) For optical phased arrays containing a large number of emission elements (such as >100), the number of output channels in the light splitting network is also very large. The use of very few types of splitters in the network requires only a small number of basic elements to be focused on in design and manufacturing, and their number does not change with the total number of emission elements, resulting in better scalability.

ILLUSTRATED FIGURES

The attached figures are not intended to be drawn to scale. In the accompanying figures, each identical or approximately identical component shown in each figure can be represented by the same label. For clarity, not every component is marked in each diagram. Now, embodiments of various aspects of the present invention will be described through examples and with reference to the accompanying figures, wherein.

Figure 2:
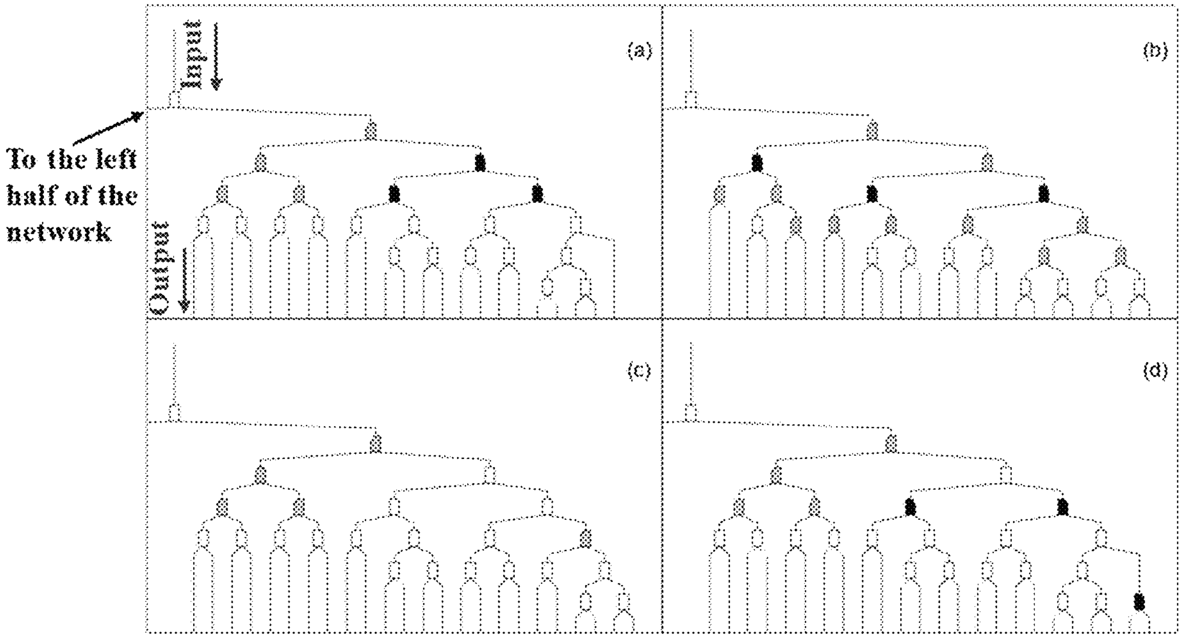
FIG. 2 is a schematic diagram of light splitting network of the optical phased array for several embodiments of the present invention.

Among them, 1 is the design value of the light intensity distribution at each output port of the light splitting network shown in FIG. 2 (*a*), and 2 is the probability distribution of the possible values of the light intensity distribution at each output port of the light splitting network shown in FIG. 2 (*a*) after considering a maximum deviation of 20 nanometers.

EMBODIMENT

In order to better understand the technical content of the present invention, specific embodiments are given and illustrated below in conjunction with the attached figure. Various aspects of the invention are described in the present disclosure with reference to the accompanying drawings, which show many illustrated embodiments. Embodiments of the present disclosure need not be defined to include all aspects of the invention. It should be understood that the various ideas and embodiments described above and those described in more detail below can be implemented in any one of many ways, because the ideas and embodiments disclosed by the invention are not limited to any embodiment. In addition, some aspects of the present disclosure may be used alone or in any appropriate combination with other aspects of the present disclosure.

Figure 1:
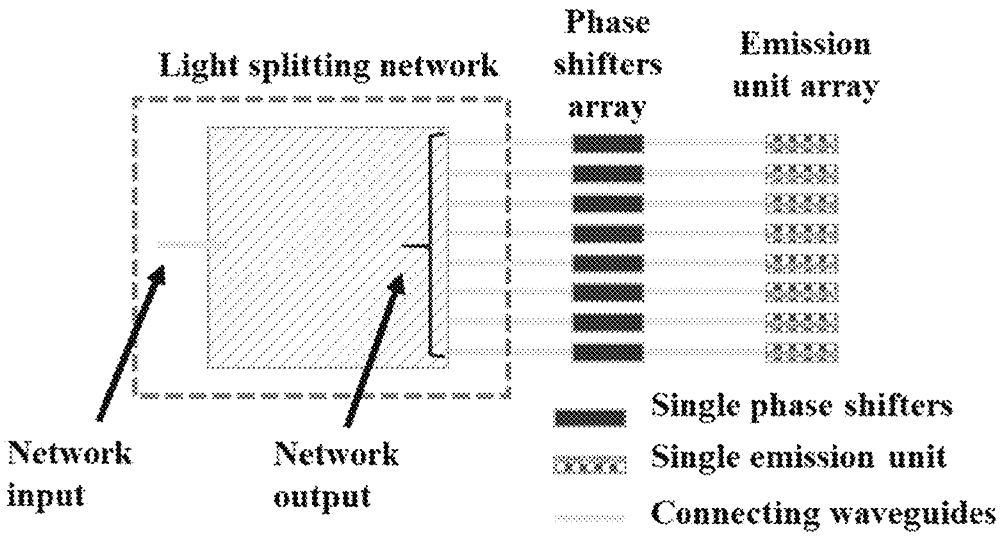
FIG. 1 is a schematic diagram of the structure of the optical phased array described in the present invention.
Figure 3:
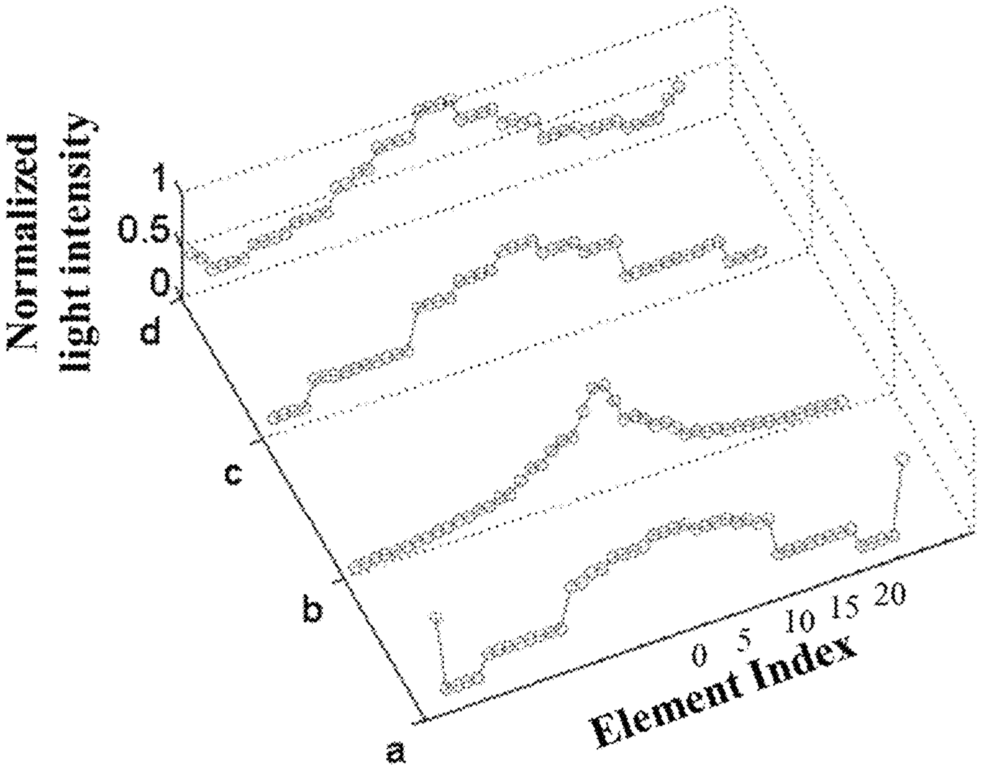
FIG. 3 is a schematic diagram of the light intensity distribution at the output port corresponding to the light splitting network of several embodiments of the present invention.

The invention provides an optical phased array device, whose light splitting network can flexibly set weights and has good scalability. Several examples of the light splitting network are shown in FIG. 2. The input port of the light splitting network in FIG. 2 is in the upper area of the figure, and the output port is in the lower area of the figure (the direction of the figure is rotated 90 degrees with respect to the light splitting network in FIG. 1). The light splitting network in FIG. 2 is composed of three types of 1×2 MMIs and conventional waveguides, specifically symmetrical MMI (no filled color), MMI with corner cut on the left (gray filled) and MMI with corner cut on the right (black filled). Considering that the overall light splitting situation of an optical phased array is left-right symmetric in many cases, each sub-graph in FIG. 1 shows only the right half network below the top (symmetric) MMI, and the left half network is mirror symmetric with the right half network, so repeated drawing is omitted. Note that the MMI with corner cut on the left/right in this example is exactly the same after mirror reflection. Therefore, the workload in design and process validation is equivalent to that of a device, rather than multiple MMIs. For the 1×2 MMI with a corner cut, the output light intensity of one side with corner cutting may be greater than that of the other side. The structures of four network in FIG. 2 are different, and the corresponding output intensity distribution of the array element is also different, reflecting the freely adjustable characteristics of the proposed network structure, as shown in FIG. 3. The curves in FIG. 3 (*a*)-(*d*) correspond to the network architecture in FIG. 2 (*a*)-(*d*) respectively.

Next, take FIG. 2 (*a*) as an example to verify the excellent characteristics of the network architecture proposed by the invention.

Figure 4:
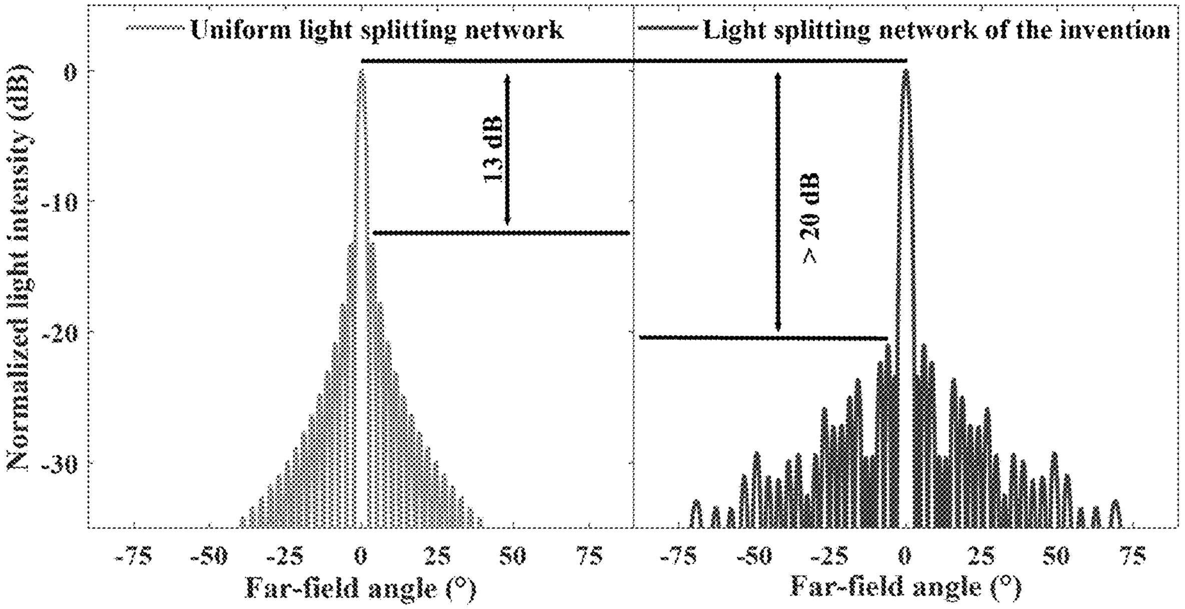
FIG. 4 shows the far-field pattern that can be generated by the light splitting network of the optical phased array shown in FIG. 2 (*a*).

FIG. 4 shows the far-field pattern produced by the optical phased array with the light splitting network shown in FIG. 2 (*a*), whose sidelobe suppression ratio is more than 20 dB, while the sidelobe suppression ratio of the optical phased array with uniform light splitting is only about 13 dB.

Nowadays, optical phased array devices are gradually being integrated into chips. For devices on the chip, the device area needs to be as small as possible. It can be proved that for a given number of output channels $N_{out}$, the width and length of the star coupler are roughly proportional to $N_{out}$, and its area is roughly proportional to $N_{out}^2$. The length of the light splitting network in this invention is roughly proportional to the log $N_{out}$, and the area is roughly proportional to the $N_{out}$ log $N_{out}$. Therefore, with the increase of the number of output channels, the area of the device in the invention increases slowly, which helps to save area and has good scalability. Note that the optical devices on the chip are often called integrated photonic devices. The optical phased array on the chip includes an optical phased array based on integrated optical waveguide and related devices. On the chip, multimode interference devices and directional couplers can be realized by devices based on integrated optical waveguides. In the case of directional coupler, although there are usually two physical input ports, when used as a splitter, only one of them is used, and this port is called the effective input port. Similarly, the input port in the invention generally refers to such effective input port without special instructions.

Figure 5:
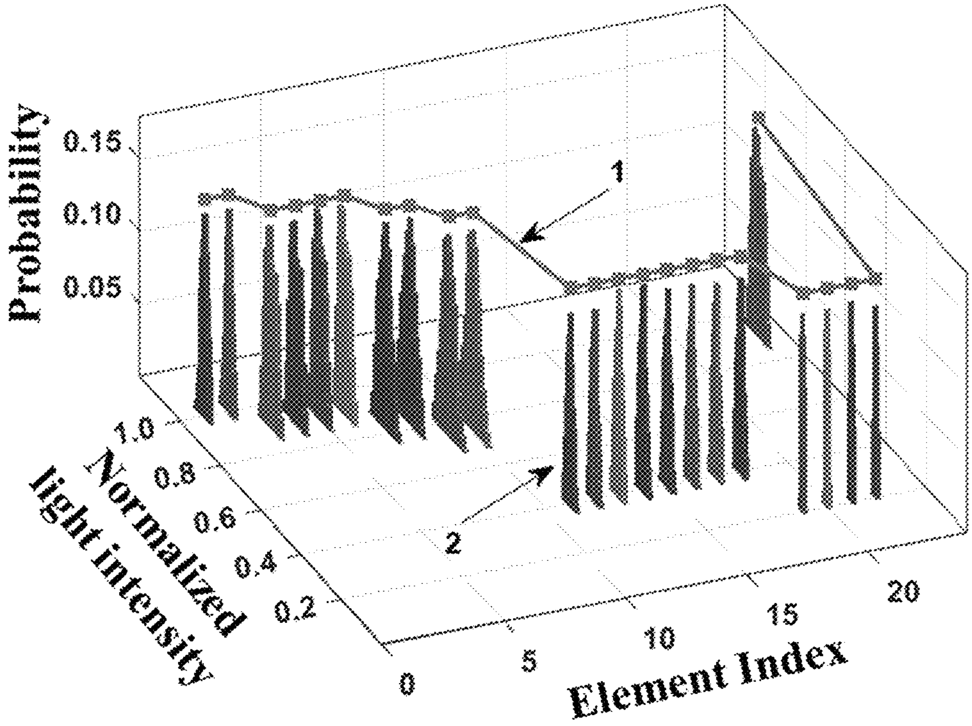
FIG. 5 shows the probability distribution of the possible values of the light intensity distribution at each output port of the light splitting network shown in FIG. 2 (*a*) with the maximum deviation of 20 nanometers, and the corresponding design values are also attached for comparison.

The most common type of process deviation introduced during processing is that the device size shrinks inward or expands outward as a whole. When simulating the impact of process deviation on the proposed network architecture, we firstly keep the network architecture consistent, and randomly generate 10000 groups of device with size deviation (the maximum deviation is 20 nanometers), and simulate the splitting ratio of the light splitter with deviation, and then bring it into the network to get the specific light splitting situation of the whole network. According to the statistics of the light splitting situation of the network, the probability distribution of the possible values of the light intensity distribution at each output port of the light splitting network composed of the deviated splitters are shown in FIG. 5, and the corresponding design values are also attached, which reflects the insensitivity of the proposed network architecture to process deviation. As a comparison, the simulation shows that the network splitting deviation (root mean square value) based on the directional coupler with the same splitting characteristics will be more than 5 times larger than the scheme proposed in the invention.

Figure 6:
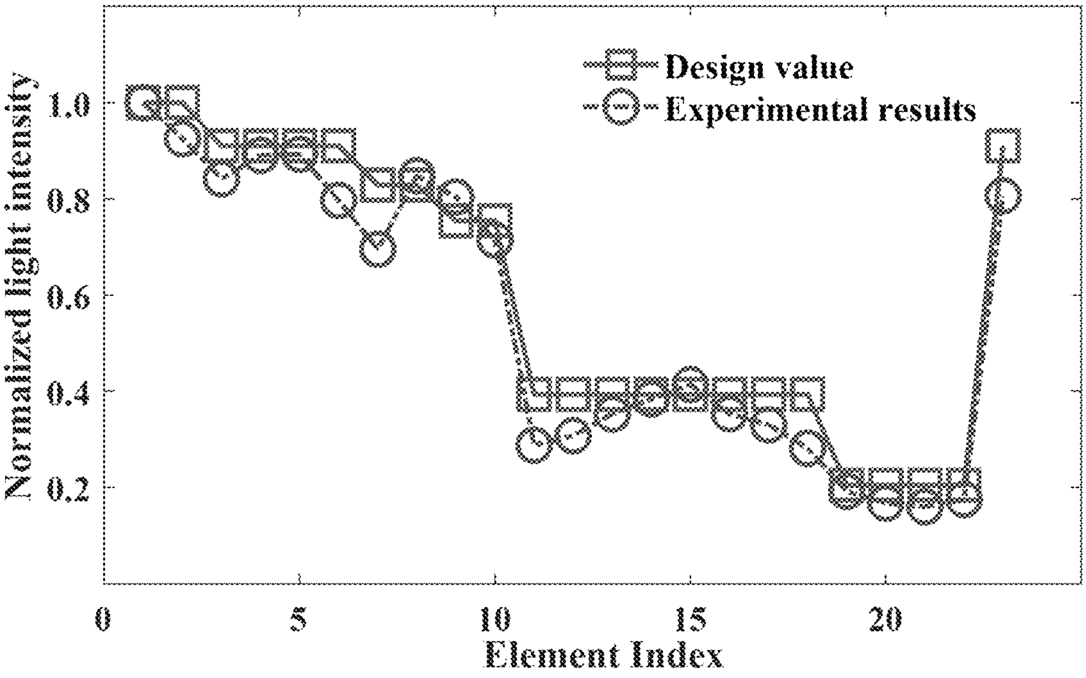
FIG. 6 shows the experimental measurement result of the light intensity distribution at each output port of the light splitting network shown in FIG. 2 (*a*) after processing on an actual SOI wafer, and the corresponding design values are also attached for comparison.

In order to further verify the proposed network architecture, the light splitting network shown in FIG. 2 (*a*) is fabricated on the SOI wafer. In the experimental test, the operating wavelength of the input signal is 1.55 μm. The actual light splitting situation and design value of the device are shown in FIG. 6, which are in good agreement.

As mentioned earlier, the network in this embodiment has left and right symmetry on the whole, so only half of the network, including computer simulation and actual experimental measurement, is considered when analyzing its light splitting performance. The specific results can be seen in FIG. 5 (simulation) and FIG. 6 (experimental measurement) respectively. Note that in some implementation cases, the light splitter at the network node can have more than two output ports (the number of output ports of different light splitters can be different, for example, some have two output ports, and some have three output ports), and the corresponding network is no longer a binary tree. In some implementation cases, the whole network may not have left and right symmetry. In such case, the top MMI in FIG. 2 is not necessarily symmetrical, and the left half network is not necessarily mirror symmetrical with the right half network.

Although the invention has been disclosed in a preferred embodiment, it is not intended to define the invention. Those who have general knowledge in the technical field of the invention can make various changes and refinements without departing from the spirit and scope of the invention. Therefore, the scope of protection of the invention shall be subject to those defined in the claims.

Those skilled in the art should understand that the embodiments of the invention shown in the above description and the accompanying drawings are only examples and do not limit the invention. The purpose of the invention has been completely and effectively realized. The functions and structural principles of the invention have been shown and explained in the embodiments. Without deviating from the principles, the implementation mode of the invention can have any deformation or modification.

The invention claimed is:

1. An optical phased array device wherein the light splitting weight of each array element is set, comprising:
- a light splitting network having a plurality of nodes;
- a plurality of phase shifters; and
- a plurality of emission units;
- the light splitting network controlling optical power weight of each array element;
- the light splitting network comprising a plurality of light splitters, and the network adopts a tree topology structure, and there are light splitters used by each node in the network,
- wherein the element used by each node of the light splitting network is a light splitter with N output ports (N>2), and the optical power splitting among N ports is either uniform or non-uniform,
- wherein the light splitting network comprises N kinds of light splitters; the number N is greater than one, but less than the total number of light splitters used in the network.

2. The optical phased array device according to claim 1, wherein the light splitter with N output ports used in the light splitting network comprises a multimode interference (MMI) device.

3. The optical phased array device according to claim 2, wherein uniform splitting is achieved by symmetric MMI and non-uniform splitting is achieved by asymmetric MMI in the light splitting network; the asymmetric MMI is obtained by modifying the symmetric MMI such that the geometric symmetry of the original symmetric MMI device is broken, resulting in non-uniform power splitting of the modified MMI.

4. The optical phased array device according to claim 1, wherein the first layer of light splitting network has one input port, which is then coupled to a light splitter element;

iteratively, if the network currently has L layers and the number of ports in the L layer is $N_L$, then each port in that layer is coupled to a light splitter with multiple output ports, the splitter coupled to each port is either same or different, and the number of network ports is expanded, while the number of layers in the network is increased by one, in this way, the network forms a tree like topology structure.

5. The optical phased array device according to claim 4, wherein the topology structure of the light splitting network is designed, that is, the connection between ports at various levels of the network is freely set, not limited to the form of a binary tree, nor limited to the form of a full binary tree; the only certainty is that the network has only one valid input port, and starting from the second layer, the number of ports present in the network is no longer fixed.

6. The optical phased array device according to claim 4, wherein, when the topology structure of the light splitting network of optical phased array is fixed, that is, when the connection between ports at different levels of the network is fixed, the splitting status of each light splitter with N output ports is set to set the splitting status of the entire network; the setting method is to maintain the topology structure of the entire network, that is, each node has the same number of input and output ports, but each node comprises at least one light splitter according to the demand for light power distribution ratio between output ports.

7. The optical phased array device according to claim 5, wherein the light splitting setting ability of the light splitting network of optical phased array is contributed by two factors: firstly, the topology structure of the network is designed, and secondly, under the determined topology structure, components with the same topology structure but different light splitting situations are selected.

8. The optical phased array device according to claim 4, wherein the overall power splitting of the light splitting network, which is the optical power distribution from the output ports of the last layer of the light splitting network, exhibits the characteristic that the power decreases from the middle ports to the ports on the two sides.

9. The optical phased array device according to claim 4, wherein the overall power splitting of the light splitting network, that is, the optical power distribution from the output ports of the last layer of the light splitting network exhibits the characteristic that decreases from the middle ports towards the ports on the two sides, with the exception of Ns ports that are closest to the two sides where the power rise up.

10. The optical phased array device according to claim 1, wherein the branch node position on each branch of the tree structure is designed, and the light splitter at each node is selected.

* * * * *